(12) United States Patent
Ogram

(10) Patent No.: US 6,598,337 B2
(45) Date of Patent: Jul. 29, 2003

(54) BEE LURE

(76) Inventor: Mark E. Ogram, 780 S. Freeman Rd., Tucson, AZ (US) 85748

( * ) Notice: Subject to any disclaimer, the term of this patent is extended or adjusted under 35 U.S.C. 154(b) by 0 days.

(21) Appl. No.: 09/891,104

(22) Filed: Jun. 25, 2001

(65) Prior Publication Data

US 2002/0194775 A1 Dec. 26, 2002

(51) Int. Cl.⁷ .............................. A01M 1/02; A01M 1/16
(52) U.S. Cl. .............................. 43/114; 43/107; 222/3
(58) Field of Search ........................ 43/125, 127, 128, 43/132.1, 107; 102/328–330, 334, 367; 116/273; 222/3

(56) References Cited

U.S. PATENT DOCUMENTS

| | | | | |
|---|---|---|---|---|
| 3,590,770 A | * | 7/1971 | Wagner | 116/103 |
| 3,599,571 A | * | 8/1971 | Richardson | 102/367 |
| 3,785,569 A | * | 1/1974 | Helmrich | 102/368 |
| 3,881,420 A | * | 5/1975 | Smith et al. | 102/334 |
| 4,160,335 A | | 7/1979 | Von Kohorn et al. | |
| 4,349,980 A | * | 9/1982 | McKee | 43/75 |
| 4,938,144 A | * | 7/1990 | Demarest | 102/204 |
| 4,962,857 A | | 10/1990 | Adams | |
| 5,004,446 A | | 4/1991 | Guong-Hong | |
| 5,402,591 A | * | 4/1995 | Lee | 248/160 |
| 5,548,922 A | | 8/1996 | Wefler | |
| 5,799,436 A | * | 9/1998 | Nolen et al. | 43/112 |
| 5,900,244 A | | 5/1999 | Howse | |
| 5,943,815 A | * | 8/1999 | Paganessi et al. | 43/107 |
| 5,983,801 A | * | 11/1999 | Brunn | 102/334 |
| 6,032,406 A | * | 3/2000 | Howse et al. | 43/107 |
| 6,041,543 A | | 3/2000 | Howse | |
| 6,083,498 A | | 7/2000 | Landolt | |
| 6,209,256 B1 | * | 4/2001 | Brittin et al. | 43/107 |

FOREIGN PATENT DOCUMENTS

JP         06245676 A    *   9/1994   .......... A01M/01/02

* cited by examiner

Primary Examiner—Charles T. Jordan
Assistant Examiner—Tara M Golba

(57) ABSTRACT

A lure for bees which is utilized during a rescue attempt. The lure is activated by the rescuer and tossed a short distance away from the attack site to draw the attacking bees, together with newly arriving bees, away from the victim and the rescuer. The lure is equipped with a variety of devices designed to attract the bees, including, but not limited to: noise attraction, chemical attraction, and motion attraction.

15 Claims, 3 Drawing Sheets

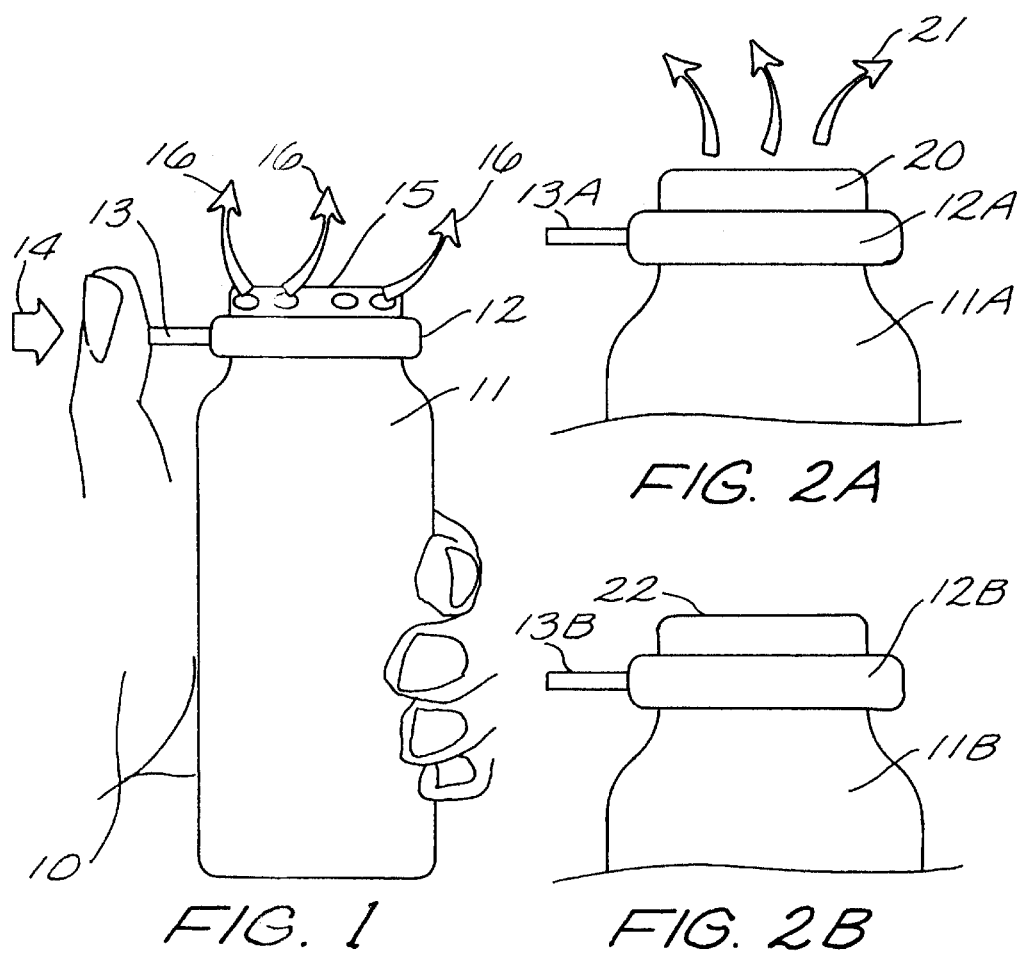
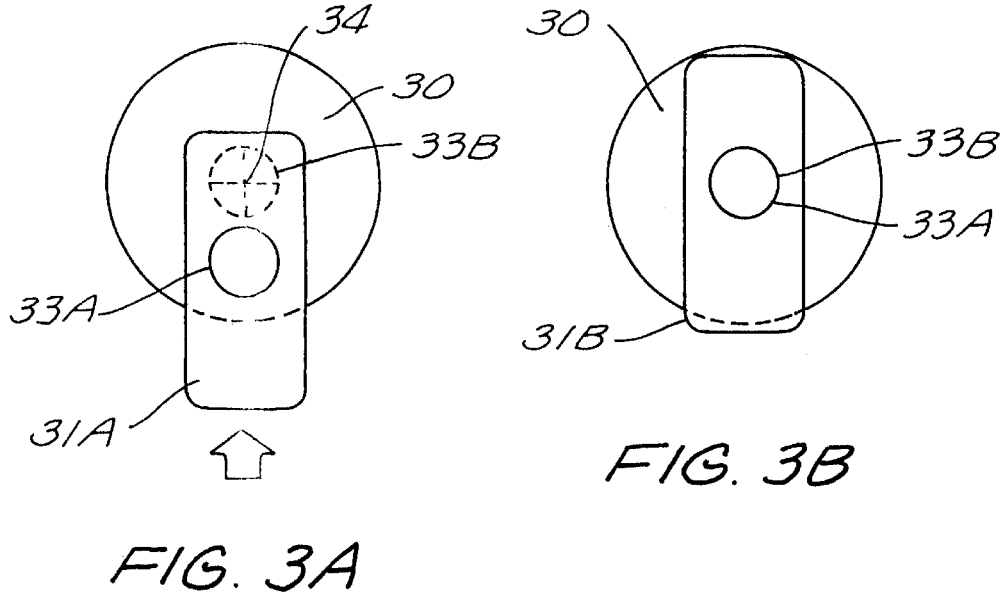

BEE LURE

BACKGROUND OF THE INVENTION

This invention relates generally to bees and more particularly to lures for bees.

The number and intensity of bee attacks is growing at an alarming rate. With the migration of "africanized" bees into the United States, these attacks are expected to grow.

Attacks by bees pose two challenges: the effect on the victim; and, the protection of any would-be rescuer. While there have been numerous devices and chemicals directed to assisting the victim, little has been done for the protection of the rescuer.

The current methodology for protecting the rescuer hasn't changed much since the beginning of time. The rescuer, before entering the attack zone, covers his body and face with protection to prevent the bees from gaining access to him. Firefighters utilize netting to protect their face and often use duct tape to seal their shirt sleeves and pant legs prior to entering the area.

While this is effective, in an emergency situation, the time required to fully garb prior to a rescue means the victim will suffer hundreds, if not thousands, of additional stings prior to rescue. This additional toxic assault often means the difference between life and death.

The present invention provides a level of protection for the rescuer while at the same time providing means to minimize the bee attack.

SUMMARY OF THE INVENTION

The invention creates a lure for bees configured to be utilized during a rescue attempt. The lure is created to draw bees away from the attack site, thereby providing a level of protection for both the victim and the rescuer.

Within the invention, the lure has a pressurized bottle. A valve is released/opened to activate the lure. In the preferred embodiment, once the valve is opened, it stays open until all of the gas within the pressurized container is exhausted.

In operation, the lure is activated by the rescuer and tossed a short distance away from the attack site. The distance thrown should not be so far that the lure's effect on drawing the bees away is minimal, neither should the lure be thrown so close as to keep the bees in the vicinity. The ideal distance is from ten to fifteen feet away.

The lure draws the attacking bees, together with newly arriving bees, away from the victim and the rescuer. Attacking bees, which have not stung the victim, are pulled to the lure; and other bees coming to the attack site are drawn to the lure instead.

Once these bees have been drawn away, not only does the stinging action against the victim subside, but, also, the area around the victim is now "safer" for the rescuer. This allows the rescuer to remove the victim at minimal risk to the rescuer.

To effectuate the lure of the bees away from the victim, a variety of techniques are used in various embodiments of the invention. These include, but are not limited to: noise attraction, chemical attraction, and motion attraction.

Noise is a powerful trigger for bee attacks. It is well known that loud noises (i.e. lawnmower noise) have triggered attacks. For this embodiment, a loud noise is created by the gas escaping from the pressure vessel.

The noise is chosen to have optimal drawing power for the bees and is well known to those of ordinary skill in the art.

The noise also serves as an alarm, warning others in the area of the attack. People not involved in the rescue are then alerted to call for emergency help.

Insects, and particularly bees, are responsive to chemical signals. A variety of attractive and attack chemicals are well known to those of skill in the art Some such chemicals are described in U.S. Pat. No. 4,962,857, entitled "Swarm Lure Package" issued to Adams on Oct. 16, 1990; U.S. Pat. No. 5,004,446, entitled "Device and Method for Collecting Bee Venom by Attracting and Electrocuting Injurious Bees" issued to Guong-Hong on Apr. 2. 1991; U.S. Pat. No. 6,041,543, entitled "Pest Trap Having an Electrostatically Charged Surface" issued to Howse on Mar. 28, 2000; U.S. Pat. No. 4,160,335, entitled "Dispensers for the Controlled Release of Pest-Controlling Agents and Methods for Combatting Pests Therewith" issued to Von Kohom et al. On Jul. 10, 1979, U.S. Pat. No. 5,548,922, entitled "Insect Bait Station" issued to Wefler on Aug. 27, 1996; and, U.S. Pat. No. 5,900,244, entitled "Insect Attractant" issued to Howse on May 4, 1999; all of which are incorporated hereinto by reference.

In one embodiment of the invention, these chemicals are released from solids as the gas from the pressure vessel escapes over the solids; in other embodiments, the chemicals are mixed into the gas during manufacture.

Motion and color are also strong triggers for attack within bees. Dark colors, when combined with motion, provides attack stimulation for bees that are hard for the bees to resist.

Within one embodiment of the invention, dark colored streamers are flapped by the escaping gas to draw the bees. In another embodiment of the invention, a silhouette is inflated by the escaping gas, drawing the bees to the vibrating silhouette.

To capture the bees once they are drawn to the motion, one embodiment of the invention coats the outside of the streamers or silhouette with an adhesive, thereby trapping any bees that light upon the streamer or silhouette.

In application then, the rescuer activates the lure and tosses it a short distance from the victim, who is often prostrate on the ground. The lure pulls many of the bees away from the victim, allowing the rescuer to assist the victim with minimal danger.

The invention, together with various embodiments thereof, will be more fully explained by the accompanying drawings and the following explanation thereof

DRAWINGS IN BRIEF

FIG. 1 is a side view of the preferred embodiment of the invention.

FIGS. 2A and 2B illustrate alternative embodiments of the invention for scent attractants and silhouette attractants.

FIGS. 3A and 3B illustrate the operation of the release valve used in the invention.

DRAWINGS IN DETAIL

Figures 4A, 4B:
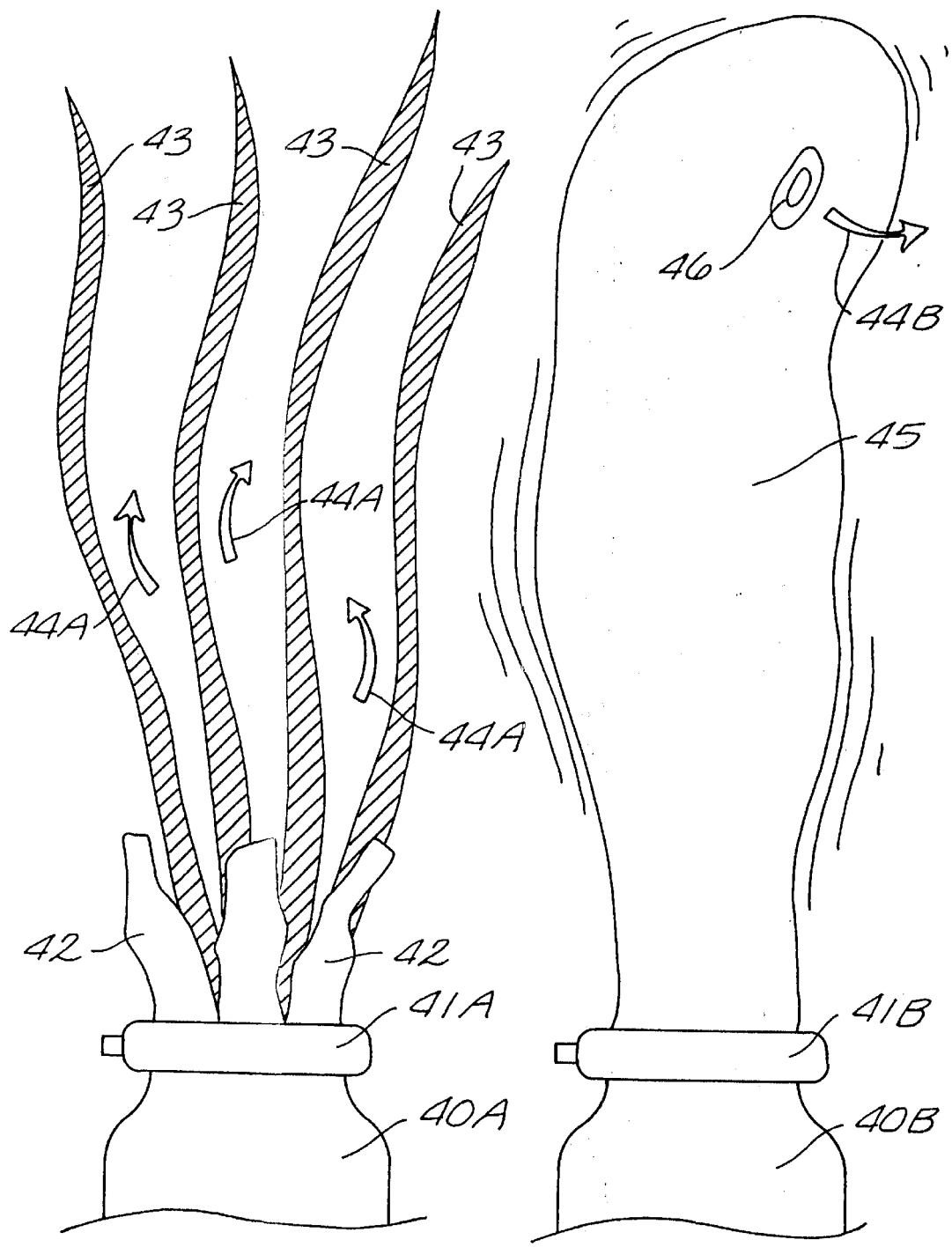
FIGS. 4A and 4B illustrate motion attractants.

FIG. 1 is a side view of the preferred embodiment of the invention.

Pressure container 11, in this embodiment, is configured to be held in the hand of user 10. Valve 12 is positioned at the top of pressure container 11. When valve 12 is activated by pressing slide 13 as indicated by arrow 14, the gas within pressure container 11 escapes through noise maker 15.

In this embodiment of the invention the gas within pressure vessel 11 is treated with a chemical attractant which escapes through noise maker 15 as indicated by arrows 16. This embodiment lures the bees away from the victim using both noise (via noise maker 15) and chemical attractant 16.

In the preferred embodiment of the invention, valve 12 is a single use type. Once opened by pressing slide 13, valve 12 remains open to exhaust all of the gas within pressure vessel 11.

FIGS. 2A and 2B illustrate alternative embodiments of the invention for scent attractants and motion attractants.

Referring to FIG. 2A, pressure vessel 11A has valve 12A with attendant slide 13A positioned thereon. When valve 12A is activated, the escaping gas passes through chemical chamber 20, capturing a chemical attractant 21. The attractant is stored within chamber 20 in granule form, allowing the escaping gas to efficiently mix therewith.

Those of ordinary skill in the art readily recognize a variety of attractants which can be used in this context.

In one embodiment of the apparatus of FIG. 2A, chemical chamber 20 is sealed during manufacture with a plastic sheet/cover. When slide 13A activates valve 12A, the escaping gases rip or dislodge the seal from chemical chamber 20.

The embodiment of FIG. 2B relates to the creation of motion to attract the bees from the victim.

Pressure vessel 11B is equipped similar to those above with valve 12B and slide 13B. In this embodiment though, streamers or a silhouette (neither shown in this illustration) is encased within package 22. Package 22 is designed to rupture when the escaping gas passes through valve 12B.

FIGS. 3A and 3B are top views of the release valve and illustrate the valve's operation.

Referring to FIG. 3A, valve 30 is similar to those discussed above. Slide 31A is slideably secured to valve 30. Opening 33A, in slide 31A is positioned (in the closed state of FIG. 3A) away from opening 33B of the pressure vessel. A small rubber gasket (not shown) seals the pressure vessel to slide 31A.

In this embodiment, opening 33B is sealed with a rupturable membrane 34. When slide 31A is moved in the direction of arrow 32 (to the "open" state illustrated in FIG. 3B), the rupturable membrane 34 is exposed. Rupturable membrane 34 is adapted to withstand pressure from the pressure vessel for a limited amount of time (ideally five to ten seconds) before it ruptures.

As shown in FIG. 3B, when slide 31B is pushed to the "open" position, opening 33A aligns with opening 33B, thereby allowing the rupturable membrane 34 (not shown in FIG. 3B) to rupture and the gas within the pressure vessel to escape.

FIGS. 4A and 4B illustrate two motion attractants.

FIG. 4A, illustrates an embodiment of the invention which uses moving streamers to attract the bees away from the victim. When valve 41A is opened, gas from pressure vessel 40A causes covering 42 to split, releasing streamers 43 to be raised and waved in the outflow 44A of the gas. Streamers 43, flat in this embodiment, are ideally dark in color. The movement of streamers 43, together with their dark color, act to attract the bees from the attack site.

The embodiment shown in FIG. 4B uses pressure vessel 40B and valve 41B. When valve 41B is opened, a three-dimensional silhouette 45 is inflated. Due to the flow of air through silhouette 45, silhouette 45 vibrates and moves to attract the bees.

This embodiment is also equipped with sound maker 46, through which escaping gas 44B flows. The sound emitted from sound maker 46 acts to further attract the bees away from the victim.

Figure 5:
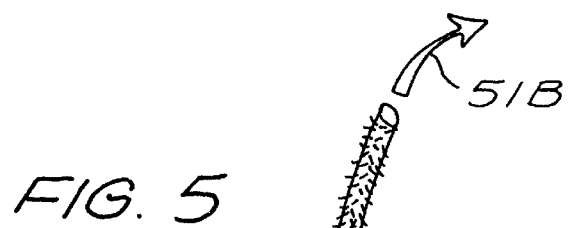
FIG. 5 illustrates an adhesive lined streamer.

FIG. 5 illustrates an adhesive lined streamer.

Streamer 50 (which is usable in the embodiment of FIG. 4A) is a hollow tube through which the escaping gas from the pressure vessel (not shown) travels. In the passage into, as illustrated by arrow 51A, and then in exiting of streamer 50, as illustrated by arrow 511B, the gas flow causes streamer 50 to shake and vibrate to attract bees thereto (as illustrated by bee 54).

To prevent bee 54 from escaping once it alights on streamer 50, a light adhesive 53 coats the outside surface of streamer 50. Once a bee lands on streamer 50, the bee cannot escape and return to the victim, thereby providing an additional level of protection for both the victim and the rescuer.

Figure 6:
FIG. 6 illustrates the preferred use of the invention.

FIG. 6 illustrates the preferred use of the invention.

In a rescue situation, while victim 62 is being attacked by bees, rescuer 10 activates the pressure vessel 60 as described above and tosses, 61, the pressure vessel to the far side of victim 62. Lure 63 draws bees away from victim 62, and rescuer 10, thereby providing a level of protection during the rescue operation.

It is clear the present invention provides for a highly improved apparatus to lure bees away from a victim.

What is claimed is:

1. A bee lure comprising:
  a) a pressurized container containing a pressurized gas therein;
  b) a release valve adapted to release all of said gas from said pressurized container once said release valve is activated; and,
  c) a noise maker reactive to gas passing from said release valve, said noise maker generating a sound adapted to attract bees.

2. The bee lure according to claim 1,
  a) wherein said release valve includes a delay mechanism adapted to delay release, for a specified period of time, of said gas from said pressurized container after activation of said release valve; and,
  b) wherein said pressurized container is configured to be tossed by a user.

3. The bee lure according to claim 2, further including a gaseous attractant for bees, said gaseous attractant being released into the environment as the gas escapes from said release valve.

4. The bee lure according to claim 1, further including a flailing shape reactive to gas escaping from said release valve.

5. The bee lure according to claim 4,
  a) wherein said flailing shape is dark colored; and,
  b) wherein said flailing shape includes an adhesive located on an exterior surface thereof.

6. A bee Lure comprising:
  a) a pressurized container containing a pressurized gas therein;
  b) a release valve adapted to release all of said gas from said pressurized container once said release valve is activated;
  c) an attractant for bees which is released as gas escapes from said release valve; and,
  d) a dark flailing shape reactive to gas escaping from said release valve.

7. The bee lure according to claim 6, wherein said attractant is suspended within the gas within said pressurized container.

8. The bee lure according to claim 6,
a) wherein said attractant is a solid; and,
b) wherein as the gas escapes, the gas passes over said solid to entrain said attractant in said gas.

9. The bee lure according to claim 6, further including a noise maker reactive to gas passing from said release valve, said noise maker generating a sound adapted to attract bees.

10. The bee lure according to claim 6, wherein said release valve includes a delay mechanism adapted to delay release of said gas for a specified period of time after activation of said release valve.

11. A bee lure comprising:
a) a pressurized container containing a pressurized gas therein;
b) a release valve adapted to release all of said gas from said pressurized container once said release valve is activated; and,
c) a dark flailing shape reactive to gas escaping from said release valve.

12. The bee lure according to claim 11, wherein said dark flailing shape includes an adhesive located on an exterior surface thereof.

13. The bee lure according to claim 11, further including, a noise maker reactive to gas passing from said release valve, said noise maker generating a sound adapted to attract bees.

14. The bee lure according to claim 11,
a) wherein said release valve includes a delay mechanism adapted to delay release of said gas, for a specified period of time, from said pressurized container after activation of said release valve; and,
b) wherein said pressurized container is configured to be tossed by user.

15. The bee lure according to claim 11, further including a chemical attractant for bees which is released into the environment as gas escapes from said release valve.

* * * * *